United States Patent
Yamashita

(10) Patent No.: US 10,636,393 B2
(45) Date of Patent: Apr. 28, 2020

(54) LONG PART-MOUNTING STRUCTURE OF PIANO

(71) Applicant: KABUSHIKI KAISHA KAWAI GAKKI SEISAKUSHO, Hamamatsu-shi, Shizuoka-ken (JP)

(72) Inventor: Mitsuo Yamashita, Hamamatsu (JP)

(73) Assignee: KABUSHIKI KAISHA KAWAI GAKKI SEISAKUSHO, Hamamatsu-Shi, Shizuoka-Ken (JP)

(*) Notice: Subject to any disclaimer, the term of this patent is extended or adjusted under 35 U.S.C. 154(b) by 0 days.

(21) Appl. No.: 16/366,906

(22) Filed: Mar. 27, 2019

(65) Prior Publication Data
US 2019/0304411 A1    Oct. 3, 2019

(30) Foreign Application Priority Data
Mar. 28, 2018    (JP) .................................. 2018/061286

(51) Int. Cl.
*G10C 3/12*    (2006.01)
*G10C 1/00*    (2006.01)
*F16B 12/12*    (2006.01)

(52) U.S. Cl.
CPC .................. *G10C 3/12* (2013.01); *G10C 1/00* (2013.01); *F16B 12/125* (2013.01)

(58) Field of Classification Search
CPC ........................................................ G10C 3/12
See application file for complete search history.

(56) References Cited

U.S. PATENT DOCUMENTS

| 225,700 | A | * | 3/1880 | Haines | ...................... | G10C 3/12 |
| | | | | | | 84/433 |
| 520,982 | A | * | 6/1894 | Edgren | ...................... | G10C 3/12 |
| | | | | | | 84/446 |
| 670,151 | A | * | 3/1901 | Ellis | ......................... | G10C 3/12 |
| | | | | | | 84/423 R |
| 714,666 | A | * | 12/1902 | Capra | ...................... | G10C 3/12 |
| | | | | | | 84/16 |
| 727,348 | A | * | 5/1903 | Goggan | ................... | G10C 3/12 |
| | | | | | | 84/440 |

(Continued)

FOREIGN PATENT DOCUMENTS

JP    10-63260    3/1998

*Primary Examiner* — Robert W Horn
(74) *Attorney, Agent, or Firm* — Lewis Roca Rothgerber Christie LLP

(57) ABSTRACT

A long part-mounting structure of a piano, which makes it possible to mount a long part as a component part of a piano to a mounted member without causing warpage of the long part and maintain excellent appearance of the piano even when applied to a transparent piano. This long part-mounting structure is for mounting a keyslip as a component part of the piano to a keybed over the entire longitudinal length of the keyslip. The keyslip has a contact surface in contact with the keybed over the entire longitudinal length of keyslip and a mounting protrusion extending the entire longitudinal length of the keyslip and protruding a predetermined length toward the keybed from the contact surface. The keybed has a contacted surface with which the contact surface of the keyslip is brought into contact and a long groove into which the mounting protrusion is fitted.

3 Claims, 2 Drawing Sheets

(56) References Cited

U.S. PATENT DOCUMENTS

| | | | | |
|---|---|---|---|---|
| 742,573 A * | 10/1903 | Bowen | | G10C 3/12 84/432 |
| 756,016 A * | 3/1904 | Harriss et al. | | G10C 3/12 84/440 |
| 1,250,841 A * | 12/1917 | Gandell | | F16B 5/02 403/376 |
| 1,826,848 A * | 10/1931 | Vietor | | G10C 3/12 84/435 |
| 2,505,804 A * | 5/1950 | Stein | | G10C 1/02 84/174 |
| 2,505,806 A * | 5/1950 | Stein | | G10C 1/00 84/236 |
| 2,761,344 A * | 9/1956 | Koehl | | G10C 5/00 84/171 |
| 3,090,086 A * | 5/1963 | Fata | | B27F 1/00 403/381 |
| 3,177,752 A * | 4/1965 | Andersen | | G10C 3/12 84/432 |
| 3,248,989 A * | 5/1966 | Schroth | | G10C 3/02 84/177 |
| 3,381,576 A * | 5/1968 | Johnson | | G10C 3/12 84/439 |
| 3,499,362 A * | 3/1970 | Harada | | G10C 3/08 84/434 |
| 3,664,011 A * | 5/1972 | Labastrou | | B27F 1/00 144/347 |
| 3,747,465 A * | 7/1973 | Schutze | | G10C 3/12 84/436 |
| 3,991,535 A * | 11/1976 | Keller | | E04C 3/14 52/642 |
| 4,205,583 A * | 6/1980 | Absmann | | G10C 3/12 84/430 |
| 4,299,155 A * | 11/1981 | Kumano | | G10C 3/12 84/177 |
| 4,380,947 A * | 4/1983 | Nishimoto | | G10H 1/32 84/176 |
| 4,488,472 A * | 12/1984 | Kumano | | G10H 1/32 84/434 |
| 4,988,150 A * | 1/1991 | Lindow | | A47B 91/00 108/159 |
| 5,469,772 A * | 11/1995 | Vandervoort | | G10C 3/12 84/436 |
| 5,594,188 A * | 1/1997 | Kawamura | | G10C 5/10 84/171 |
| 5,942,702 A * | 8/1999 | Inoue | | G10C 3/02 84/179 |
| 6,757,997 B1 * | 7/2004 | Burroughs | | D05C 1/02 38/102.6 |
| 7,479,591 B2 * | 1/2009 | Wheeler | | G10H 1/32 312/351.3 |
| 7,550,658 B2 * | 6/2009 | Suzuki | | G10C 3/02 16/235 |
| 7,750,222 B2 * | 7/2010 | Osuga | | G10C 3/12 84/423 R |
| 7,816,598 B2 * | 10/2010 | Ishihara | | G10C 3/12 84/423 R |
| 8,013,228 B2 * | 9/2011 | Shimizu | | G10C 3/12 84/20 |
| 8,864,407 B1 * | 10/2014 | Sorum | | F16B 5/008 403/381 |
| 9,430,993 B2 * | 8/2016 | Nagatsuma | | G10C 3/02 |
| 10,400,807 B2 * | 9/2019 | Shen | | F16B 12/125 |
| 2019/0304411 A1 * | 10/2019 | Yamashita | | G10C 3/12 |

\* cited by examiner

LONG PART-MOUNTING STRUCTURE OF PIANO

CROSS-REFERENCE TO RELATED APPLICATION(S)

This application claims priority to Japanese Patent Application Number 061286/2018, filed on Mar. 28, 2018, the entire contents of which are incorporated herein by reference.

BACKGROUND OF THE INVENTION

Field of the Invention

The present invention relates to a long part-mounting structure of a piano for mounting a long part, such as a keyslip used as a component part of a piano, to a mounted member, such as a keybed, over an entire longitudinal length of the long part.

Description of the Related Art

In general, a keyslip of a grand piano is mounted to a front end of a horizontal keybed extending relatively long in a left-right direction to support a keyboard from below, so as to support a front end of a fallboard of the piano from below when the fallboard is closed. The keyslip is generally configured such that it can be removed from the keybed so as to allow the keyboard to be pulled forward out of the piano e.g. before adjustment of the keyboard and can be mounted again to the keybed after completion of the adjustment.

In a conventional mounting structure of a piano for mounting a keyslip to a keybed, the keyslip is formed, for example, to have a bottom surface having a plurality of dowels protruding therefrom and arranged in the longitudinal direction of the keyslip at predetermined spaced intervals, and a plurality of dowel holes are formed in a front end of an upper surface of the keybed in association with the respective dowels. Each of the dowels is inserted into the associated dowel hole, whereby the keyslip is mounted to the front end of the upper surface of the keybed. However, in a case where the keyslip is made of wood, the long keyslip can be warped in a front-rear direction e.g. due to aging or an environment in which the piano is used. In this case, space between a rearward portion of the keyslip, which was warped toward a keyboard, and the keyboard is much narrowed, so that e.g. when mounting or removing the keyslip, the keyslip can hit against the keyboard, causing damage to the keyboard. To avoid such an inconvenience, there has conventionally been proposed a keyslip-mounting structure e.g. in Japanese Laid-Open Patent Publication No. H10-63260.

In a keyslip of this mounting structure, an L-shaped member made of metal and formed to have an L shape in transverse cross-section is attached to a back surface of the keyslip over the entire longitudinal length thereof. More specifically, the L-shaped member is comprised of a fixed portion and an extended portion that are formed continuous with each other such that a right angle formed therebetween. The fixed portion is mounted to the back surface of the keyslip with a plurality of wood screws, whereas the extended portion protrudes rearward to be inserted into a receiving part formed in the front surface of the keybed. In a state in which the extended portion of the L-shape member has been inserted in the receiving part of the keybed, screws for removably mounting keyslip are screwed into the keybed from below, whereby the keyslip is mounted to the front end of the keybed.

In the above-described keyslip having the L-shaped member attached thereto, the L-shaped member can suppress warpage of the keyslip in the front-rear direction. However, it is required to attach the L-shaped member as a separate member to the keyslip with a plurality of wood screws, and hence besides an increase in the number of component parts that constitute the entire keyslip, it takes much time and labor for manufacturing of the keyslip. Further, in a case where the above-described keyslip-mounting structure is applied to a piano having exterior component parts made e.g. of a transparent synthetic resin, not only the L-shaped member, but also the wood screws, the keyslip mounting screws, and so forth are sometimes viewed from the outside of the piano, which causes degradation of the appearance of the piano.

SUMMARY OF THE INVENTION

The present invention provides a long part-mounting structure of a piano, which makes it possible to mount a long part as a component part of a piano to a mounted member without causing warpage of the long part and maintain excellent appearance of the piano even when the long part-mounting structure is applied to a transparent piano.

To attain the above object, the present invention provides a long part-mounting structure of a piano for mounting a long part as a component part of a piano to a mounted member over an entire longitudinal length of the long part, wherein the long part has a contact surface in contact with the mounted member over the entire longitudinal length of the long part and a mounting protrusion extending the entire longitudinal length of the long part and protruding a predetermined length toward the mounted member from the contact surface, and wherein the mounted member has a contacted surface with which the contact surface of the long part is brought into contact and a fitting recess into which the mounting protrusion of the long part is fitted.

According to the construction of this long part-mounting structure, the long part as a component part of the piano has the contact surface and the mounting protrusion each extending the entire longitudinal length thereof, while the mounted member to which the long part is mounted is provided with the contacted surface with which the contact surface of the long part is brought into contact and the fitting recess in which the mounting protrusion of the long part is fitted. In a state in which the long part has been mounted to the mounted member, the contact surface of the long part is held in contact with the contacted surface of the mounted member, so that it is possible to securely support the long part by the mounted member from a contacted surface side. Further, since the mounting protrusion of the long part is fitted in the fitting recess of the mounted member, deformation of the mounting protrusion over the entire longitudinal length of the long part is suppressed, which consequently makes it possible to effectively prevent occurrence of warpage of the long part as a whole.

Preferably, the long part is a keyslip of the piano, and the mounted member is a keybed of the piano. The keyslip is made of a single material, with the mounting protrusion integrally formed thereon, and is removably mounted to the keybed.

According to the construction of this preferred embodiment, the long part is a keyslip of the piano, and the keyslip is made of a single material and has the mounting protrusion integrally formed thereon. Therefore, the keyslip can be easily removably mounted to the keybed simply by fitting the mounting protrusion of the keyslip into the fitting recess of the keybed, which makes it possible to reduce the number of component parts of the keyslip, compared with the conventional keyslip-mounting structure.

More preferably, the keyslip and the keybed are each made of a transparent synthetic resin.

According to the construction of this preferred embodiment, a portion, which is mounted to the keybed, of the keyslip is limited to a portion corresponding to the mounting protrusion which is fitted in the fitting recess of the keybed, so that differently from the case where the conventional mounting structure is applied to a keyslip and a keybed each made of a transparent material, no L-shaped member, no plurality of screws, and so forth are viewed in the mounted portion from the outside, which makes it possible to maintain excellent appearance of the piano 1.

The above and other objects, features, and advantages of the present invention will become more apparent from the following detailed description taken in conjunction with the accompanying drawings.

BRIEF DESCRIPTION OF THE DRAWINGS

FIGS. 2A and 2B are perspective views of the keybed and the keyslip of the grand piano in FIG. 1, in which FIG. 2A shows a state in which the keyslip has been mounted to the keybed, and FIG. 2B shows a state in which the keyslip has been removed from the keybed.

FIGS. 3A and 3B are longitudinal cross-sectional views showing the keyslip and a portion of the keybed, in which FIG. 3A shows the state in which the keyslip has been mounted to the keybed, and FIG. 3B shows the state in which the keyslip has been removed from the keybed.

DETAILED DESCRIPTION OF PREFERRED EMBODIMENTS

Figure 1:
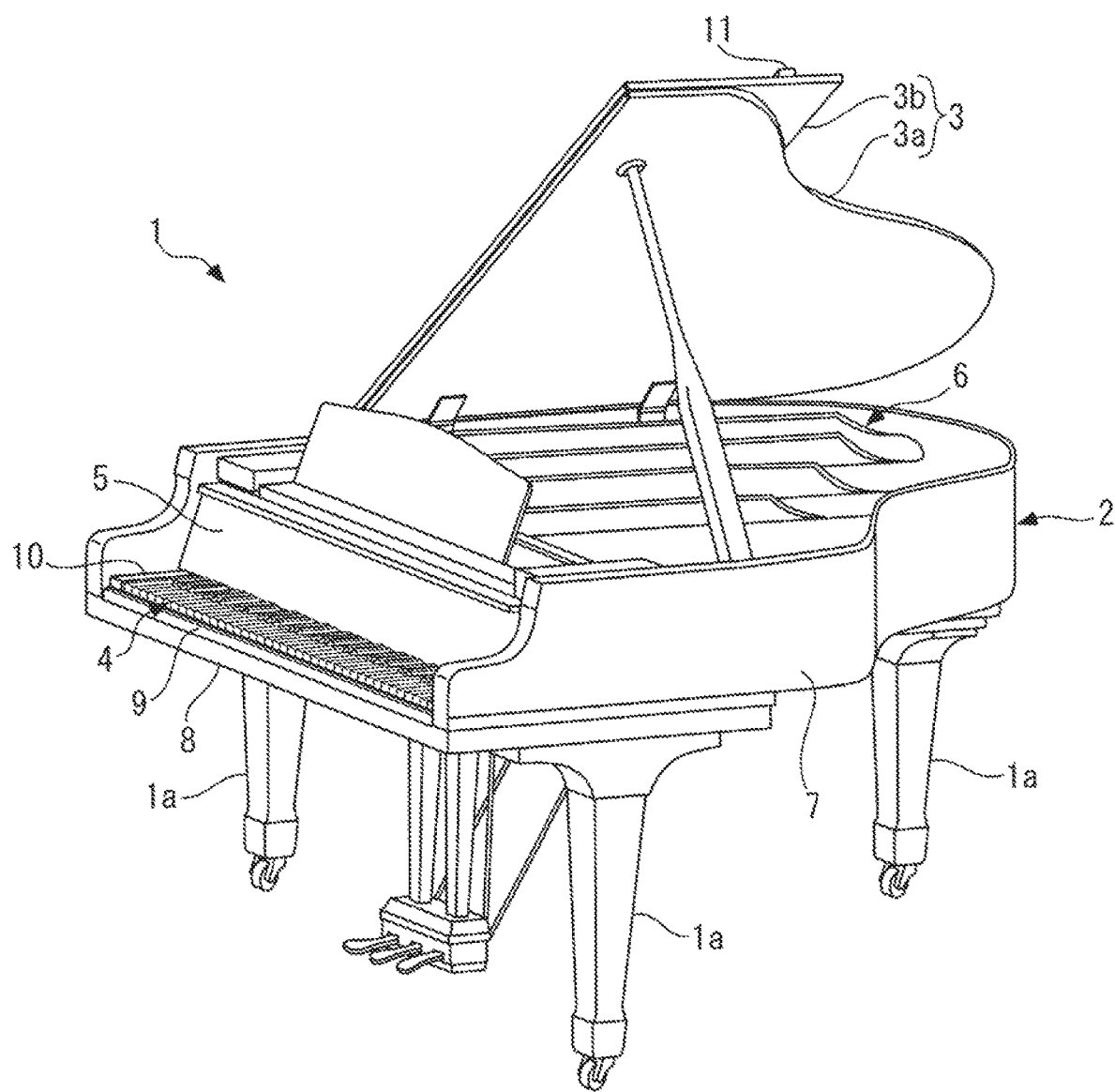
FIG. 1 is a perspective view of a grand piano in which a long part-mounting structure according to an embodiment of the present invention is applied to mounting of a keyslip to a keybed.

The present invention will now be described in detail with reference to the drawings showing a preferred embodiment thereof. FIG. 1 shows a grand piano in which a long part-mounting structure according to the embodiment of the present invention is applied to mounting of a keyslip to a keybed. This piano 1 is a so-called transparent grand piano having most exterior component parts each made of a transparent synthetic resin (e.g. acrylic resin) and is comprised of a piano body 2 supported by three legs 1a from below and a topboard 3 for opening and closing the upper face of the piano body 2.

At a front part of the piano body 2, there is provided a keyboard 4 having a large number of white keys and black keys arranged in parallel with each other in a left-right direction, and above the keyboard 4, there is provided a fallboard 5 for opening and closing the keyboard 4. Further, in a rear part of the piano body 2, there is provided a frame 6 made of metal and having a predetermined shape, and a side board 7 is disposed in a manner surrounding sides of the frame 6. Note that the topboard 3 is comprised of a topboard rear 3a having approximately the same outer shape as the shape of the side board 7 in plan view and a topboard front 3b having a laterally elongated rectangular shape and foldably connected to the front side of the topboard rear 3a via hinges, not shown.

In a front portion of the bottom surface of the piano body 2, there is provided a keybed 8 (mounted member) that supports the keyboard 4 from below via a keyframe, not shown. Further, a keyslip 9 (long part) is removably attached to a front end of the keybed 8, or specifically, immediately in front of the keyboard 4. Note that each of the keybed 8 and the keyslip 9 is made of a transparent synthetic resin, as mentioned hereinbefore.

Figure 2A:
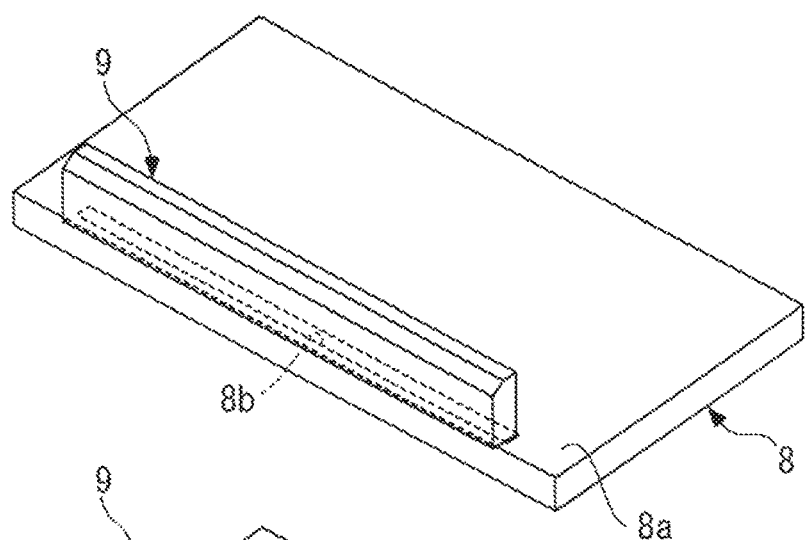
Figure 2B:
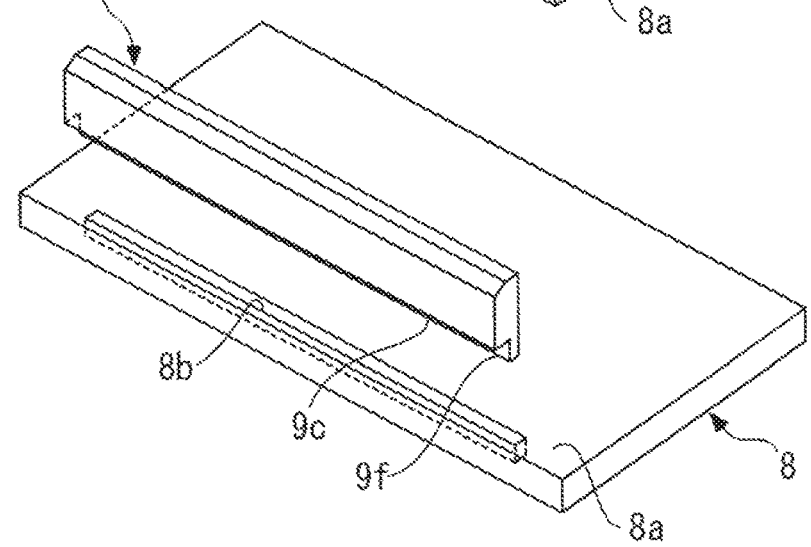

FIGS. 2A and 2B show the keybed 8 and the keyslip 9. FIG. 2A shows a state in which the keyslip 9 has been mounted to the keybed 8, and FIG. 2B shows a state in which the keyslip 9 has been removed from the keybed 8. As shown in FIGS. 2A and 2B, the keybed 8 is formed to have a predetermined thickness and a laterally elongated rectangular shape in plan view, and an upper surface 8a (contacted surface) thereof has a front end formed with a long groove 8b (fitting recess) open upward and extending a predetermined length in the left-right direction. The long groove 8b has the same length as that of the keyslip 9 and a depth approximately equivalent to the protruding length of a mounting protrusion 9f, referred to hereinafter, of the keyslip 9.

Figure 3A:
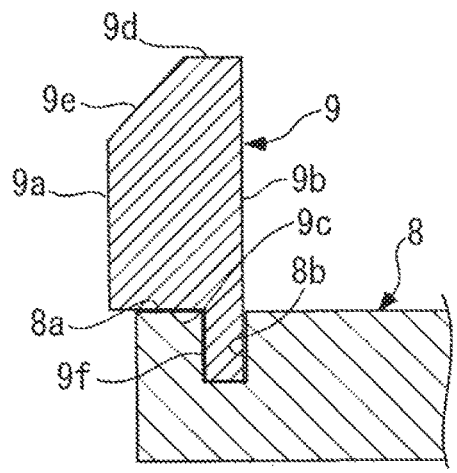
Figure 3B:
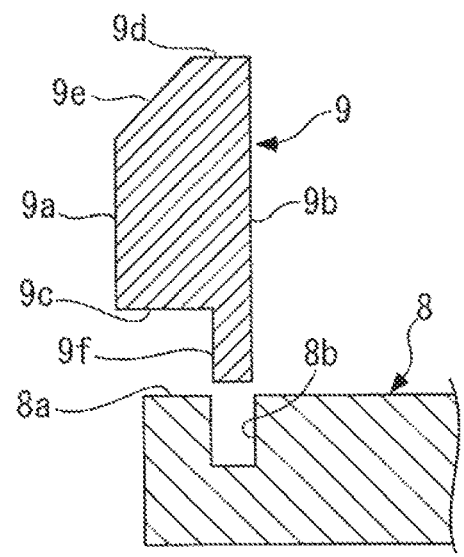

On the other hand, as shown in FIG. 3B, the keyslip 9 has a front surface 9a, a back surface 9b, a bottom surface 9c, a top surface 9d, and a sloping surface 9e, with a predetermined thickness in the front-rear direction (left-right direction as viewed in FIGS. 3A and 3B) and a predetermined height in the vertical direction, and is formed into a trapezoidal cross-sectional shape having a predetermined size. Further, the keyslip 9 is provided with the mounting protrusion 9f for fitting in the long groove 8b of the keybed 8. The mounting protrusion 9f extends the entire longitudinal length of the keyslip 9, protruding downward a predetermined length from the bottom surface 9c, and is formed flush with the back surface 9b.

Note that the keyslip 9 can be manufactured relatively easily by extrusion molding of a synthetic resin using e.g. a die formed with an extrusion port having the same shape as the cross-sectional shape shown in FIG. 3B or by appropriately cutting a synthetic resin material extruded to have a vertically elongated cross-sectional shape.

In the keybed 8 and the keyslip 9 each formed as above, the keyslip 9 is removably mounted to the keybed 8 in a state in which the mounting protrusion 9f of the keyslip 9 is fitted in the long groove 8b of the keybed 8 as shown in FIG. 3A and the bottom surface 9c of the keyslip 9 is brought into contact with the upper surface 8a of the keybed 8. Note that the keyslip 9 mounted to the keybed 8 has its opposite ends locked by respective left and right cheekblocks 10 (only the left one of which is shown in FIG. 1) in an upward immovable state.

Further, in a state in which the keyslip 9 has been mounted to the keybed 8 as described above, a front end of the bottom surface 9c of the keyslip 9 slightly protrudes forward from the front end of the keybed 8. Therefore, when removing the keyslip 9 from the keybed 8 e.g. so as to adjust the keyboard 4, locking of the opposite ends of the keyslip 9 by the left and right cheekblocks 10 is released and then an external force is applied to the protruding front end of the bottom surface 9c from below, using an appropriate tool or the like, whereby the keyslip 9 can be easily removed from the keybed 8.

As described above, according to the present embodiment, in a state in which the keyslip 9 has been mounted to the keybed 8, the bottom surface 9c of the keyslip 9 is held in contact with the upper surface 8a of the keybed 8, so that the keyslip 9 can be securely supported from below by the keybed 8. Further, since the mounting protrusion 9f of the keyslip 9 is fitted in the long groove 8b of the keybed 8, deformation of the mounting protrusion 9f is suppressed over the entire longitudinal length of the keyslip 9, which consequently makes it possible to effectively prevent occurrence of warpage of the keyslip 9 as a whole. Furthermore, the keyslip 9 can be easily mounted to the keybed 8 simply by fitting the mounting protrusion 9f of the keyslip 9 in the long groove 8b of the keybed 8, so that the number of component parts of the keyslip 9 can be reduced compared with the conventional keyslip-mounting structure. In addition, the portion, which is mounted to the keybed 8, of the keyslip 9 is limited to a portion corresponding to the mounting protrusion 9f of the keyslip 9, which is fitted in the long groove 8b of the keybed 8, so that differently from the case where the conventional keyslip-mounting structure is applied to a keyslip and a keybed each made of a transparent material, no L-shaped member, no plurality of screws, and so forth are viewed in the mounted portion from the outside, which makes it possible to maintain excellent appearance of the piano 1.

Note that the present invention is not limited to the above-described embodiment, but it can be practiced in various forms. For example, although in the embodiment, the keyslip 9 is described as the long part to which is applied the mounting structure of the present invention, by way of example, the present invention is not limited to this, but it can be applied to a mounting structure for another long part used as a component part of a piano. For example, the present invention may be applied to a mounting structure for mounting a lock bar 11 extending in the left-right direction of the piano 1 to a front end of the lower surface of the topboard front 3b. In this case, the lock bar 11 is not required to be removed from the topboard front 3b, and therefore it is preferable that the lock bar 11 is fixed to the topboard front 3b e.g. with an adhesive.

Further, although in the embodiment, the grand piano having the keybed 8 and the keyslip 9 each made of a transparent synthetic resin is described, the present invention is not limited to this, but it is applicable not only to a general grand piano in which component parts, such as the keybed 8 and the keyslip 9, are made of a wood material, but also to an upright piano having a keyslip mounted to a keybed, and so forth. Furthermore, the detailed structure of each of the keybed 8 and the keyslip 9 in the embodiment is described only by way of example, and it can be changed, as desired, within the scope of the subject matter of the present invention.

What is claimed is:

1. A long part-mounting structure of a piano for mounting a long part as a component part of a piano to a mounted member over an entire longitudinal length of the long part, wherein the piano has a front side where a plurality of keys are arranged and left and right sides adjacent to the front side, wherein the long part has a contact surface in contact with the mounted member over the entire longitudinal length of the long part and a mounting protrusion extending the entire longitudinal length of the long part and protruding a predetermined length toward the mounted member from the contact surface, wherein the mounted member has a contact surface with which the contact surface of the long part is brought into contact and a fitting recess into which the mounting protrusion of the tong part is fitted, wherein the long part extends in a direction towards left and right sides of the piano and includes the mounting protrusion protruding downward of the piano, and wherein the mounted member, at the front side, includes a recess that opens upward of the piano and extends in the left-right direction.

2. The long part-mounting structure of a piano, according to claim 1, wherein the long part is a keyslip of the piano, and the mounted member is a keybed of the piano, and wherein the keyslip is made of a single material, with the mounting protrusion integrally formed thereon, and is removably mounted to the keybed.

3. The long part-mounting structure of a piano, according to claim 2, wherein the keyslip and the keybed are each made of a transparent synthetic resin.

* * * * *